US 11,039,713 B2

(12) United States Patent
Polaczek et al.

(10) Patent No.: US 11,039,713 B2
(45) Date of Patent: Jun. 22, 2021

(54) ACCESSORY CLAMP FOR GRILL

(71) Applicant: Weber-Stephen Products LLC, Palatine, IL (US)

(72) Inventors: Karol Polaczek, Hickory Hills, IL (US); Romualdo Sonny Siazon, Woodstock, IL (US)

(73) Assignee: WEBER-STEPHEN PRODUCTS LLC, Palatine, IL (US)

( * ) Notice: Subject to any disclaimer, the term of this patent is extended or adjusted under 35 U.S.C. 154(b) by 239 days.

(21) Appl. No.: 15/387,876

(22) Filed: Dec. 22, 2016

(65) Prior Publication Data
US 2018/0177335 A1    Jun. 28, 2018

(51) Int. Cl.
| *A47J 37/07* | (2006.01) |
| *F16B 2/12* | (2006.01) |
| *F24B 3/00* | (2006.01) |
| *A47J 37/04* | (2006.01) |
| *A47J 37/06* | (2006.01) |
| *F16B 2/06* | (2006.01) |

(52) U.S. Cl.
CPC ............ *A47J 37/0786* (2013.01); *F16B 2/12* (2013.01); *F24B 3/00* (2013.01)

(58) Field of Classification Search
CPC ............ A47J 37/0786; F16B 2/12; F24B 3/00
See application file for complete search history.

(56) References Cited

U.S. PATENT DOCUMENTS

| 1,999,467 | A |   | 4/1935 | Lucke | |
|---|---|---|---|---|---|
| 2,529,285 | A | * | 11/1950 | Felton | B60R 9/08 15/220.4 |
| 3,260,486 | A | * | 7/1966 | Groff | B60R 13/00 224/317 |
| 3,904,041 | A | * | 9/1975 | Medgebow | A47G 23/0641 211/72 |
| 4,331,123 | A | * | 5/1982 | Alles | A47J 37/0786 108/152 |
| 4,337,751 | A |   | 7/1982 | Sampson | |
| 4,665,888 | A |   | 5/1987 | Christen, Jr. | |
| 5,560,576 | A | * | 10/1996 | Cargill | B60P 7/15 224/331 |
| 6,350,089 | B1 | * | 2/2002 | Tekavec | B60P 7/0807 410/101 |
| 6,808,147 | B2 | * | 10/2004 | Brannen | A47J 47/20 248/213.2 |
| 7,252,274 | B1 |   | 8/2007 | Brannen | |

(Continued)

FOREIGN PATENT DOCUMENTS

| CN | 2538246 Y | 3/2003 |
| CN | 2648976 Y | 10/2004 |

(Continued)

OTHER PUBLICATIONS

Examination Report No. 1 dated Aug. 23, 2018 in corresponding Australian Application No. 2017272143.

(Continued)

*Primary Examiner* — Jorge A Pereiro
*Assistant Examiner* — Logan P Jones
(74) *Attorney, Agent, or Firm* — Hanley, Flight & Zimmerman, LLC

(57) ABSTRACT

A clamp for securing a side table or other accessory to a grill without modifying or damaging the grill is provided.

18 Claims, 3 Drawing Sheets

(56) References Cited

U.S. PATENT DOCUMENTS 8,333,285 B2 * 12/2012 Kiehnau ............... A47F 5/0068
                                                    211/119.003
2006/0070613 A1     4/2006 Cummings

FOREIGN PATENT DOCUMENTS

CN       201436002 U    4/2010
DE    202014009471 U1   1/2015

OTHER PUBLICATIONS

Partial European Search Report dated May 3, 2018 issued in corresponding European Patent Application No. 17205875.2.

First Office Action and Search Report dated Mar. 19, 2019 in corresponding Chinese Application No. 201711408015.1.

Canadian Intellectual Property Office, "Office Action," issued in connection with Canadian Patent Application No. 2,987,452, dated Nov. 2, 2018, 6 pages.

Canadian Intellectual Property Office, "Office Action," issued in connection with Canadian Patent Application No. 2,987,452, dated Jun. 25, 2019, 6 pages.

Chilean Patent Office, "Office Action," issued in connection with Chilean Patent Application No. 201703347, dated Nov. 13, 2018, 17 pages. (English translation included).

China National Intellectual Property Administration, "Second Office Action," issued in connection with Chinese Patent Application No. 201711408015.1, dated Nov. 21, 2019, 10 pages. (English translation included).

China National Intellectual Property Administration, "Third Office Action," issued in connection with Chinese Patent Application No. 201711408015.1, dated May 15, 2020, 7 pages. (English translation included).

European Patent Office, "Communication pursuant to Article 94(3) EPC," issued in connection with European Patent Application No. 17 205 875.2, dated Dec. 11, 2019, 5 pages.

European Patent Office, "Extended European Search Report," issued in connection with European Patent Application No. 17 205 875.2, dated Aug. 6, 2018, 11 pages.

European Patent Office, "Communication pursuant to Article 94(3) EPC," issued in connection with European Patent Application No. 17 205 875.2, dated Nov. 26, 2020, 5 pages.

* cited by examiner

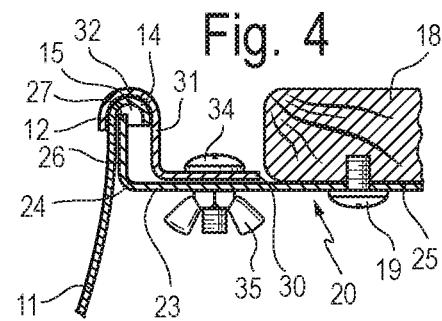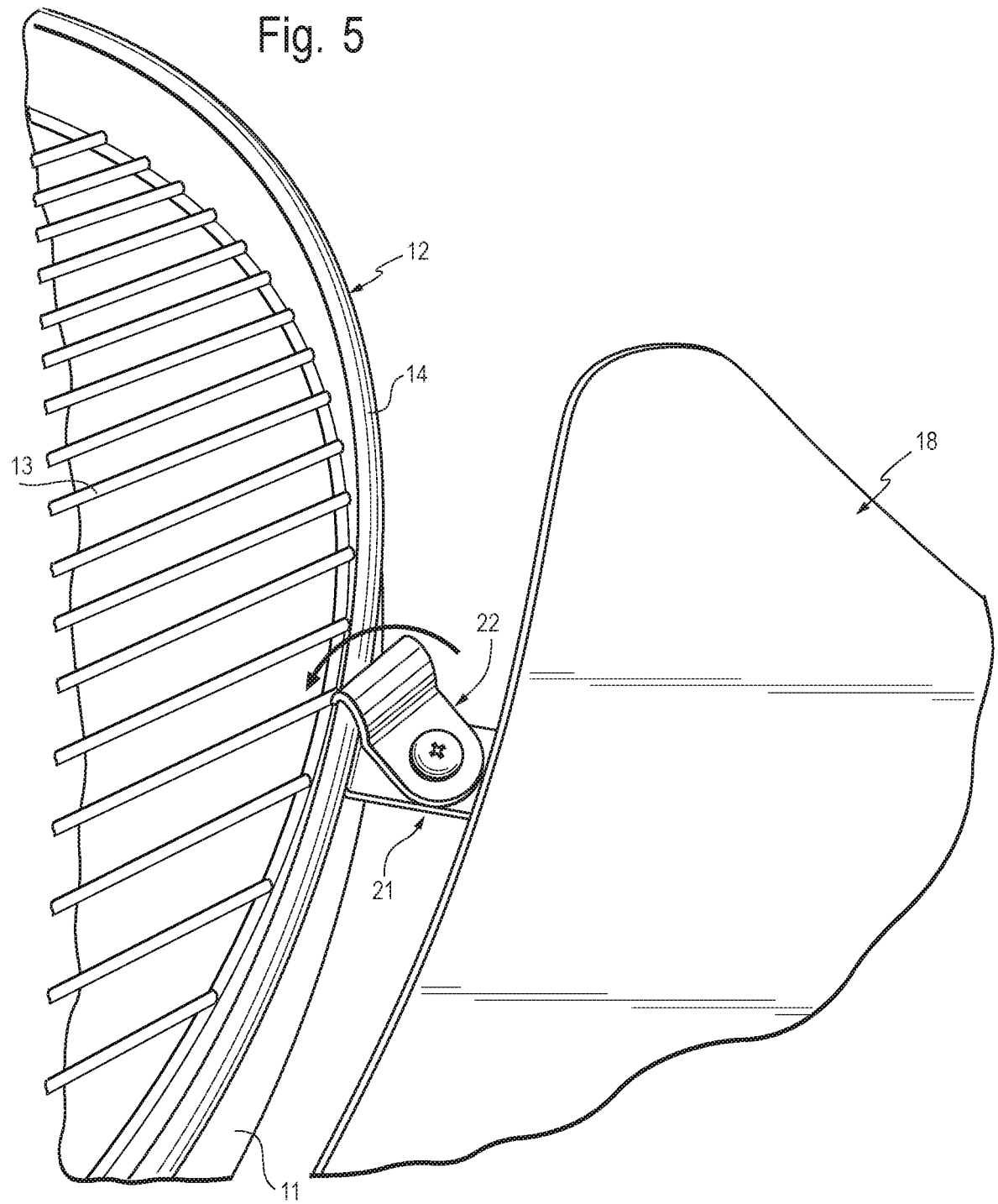

ACCESSORY CLAMP FOR GRILL

FIELD OF THE INVENTION

The present inventions relate to clamps for use on articles such as a grill. More particularly, the present inventions relate to clamps that easily and releasably attach a side table or other accessory to a grill or other article without the need to modify, damage or otherwise alter the body of the grill.

BACKGROUND OF THE INVENTION

The use of gas and charcoal grills is extremely popular. Many users desire the convenience of a side table or other accessories to hold food, plates, cooking utensils and the like. Many grills are available with stands or carts for such purposes, either as part of the grill purchased or as aftermarket accessories. However, some users may not have the space available for typical carts and/or stands that are on the market. Other users may find the carts and/or stands too expensive for their budget. Thus, there is a need for a low cost and effective way to connect a side table or other accessory to a grill.

It is also important that the integrity of the grill not be compromised. For example, many users do not desire to drill holes in their grills for safety, longevity and aesthetic reasons. Similarly, many users do not want to scratch or otherwise mar the exterior finish of their grill. In addition, many users desire that the shelf or other accessory attached to the grill be removable if its use is not desired or the user desires to transport the grill to other locations. Thus, there is also a need to removably secure a side table or other accessory to a grill without damaging or modifying the grill itself.

SUMMARY OF THE INVENTION

The present inventions preserve the advantages of known clamps and also provide new features and advantages.

Accordingly, it is an object of the present inventions to provide a clamp to secure a side table or other accessory to a grill or other article.

An additional object of the present inventions is to provide a clamp that does not require the modification of the grill.

Another object of the present inventions is to provide a clamp that does not scratch or otherwise mar the finish of the grill.

A further object of the present inventions is to provide a clamp that is easy to attach to and remove from the grill.

Still another object of the present inventions is to provide a clamp that is inexpensive and can be used on a variety of articles or grill types and support a variety of accessories.

In accordance with a preferred embodiment of the present inventions, a clamp for securing an accessory to the exterior of a grill is provided. The grill typically includes a grill body, an upper rim and a rolled lip creating a downwardly facing exterior recess. The preferred clamp includes a base member, the base member having a lateral portion with a grill attachment end and an accessory support end, the grill attachment end having an upwardly extending flange terminating in an upper edge. A hanger member securable to the base member is also provided. The hanger member includes a base portion and a vertical portion, the vertical portion including a hook portion, wherein the upper edge of the base member fits within the exterior recess on the rim of the grill and the hook portion of the hanger member engages the rolled lip of the rim of the grill. A bolt and a wing nut may be used to secure the hanger member to the base member and thus, to the grill. The accessory secured by the clamp may be a side table or other accessory, which may be secured to the accessory support end of the base member.

The present inventions also provide for a clamp used to secure an accessory to an article, the article having an upper rim and a rolled lip creating an exterior recess. The clamp includes a base member having a lateral portion, one end of the lateral portion being an accessory support end and the other end being the article attachment end, the article attachment end including an upwardly extending flange and an upper edge, the upper edge capable of engaging the exterior recess of the rolled lip of the article. Also included is a hanger member, the hanger member having a base portion that is parallel to the lateral portion of the base member and a vertical portion having an upper hook portion, the hook portion capable of engaging the rolled lip of the rim of the article. A bolt and nut may be used to secure the hanger portion to the base portion, whereby the clamp is secured to the exterior of the article. In a preferred embodiment, the article is a grill and the accessory is a side table.

Inventors' Definition of the Terms

The terms used in the claims of this patent are intended to have their broadest meaning consistent with the requirements of law. Where alternative meanings are possible, the broadest meaning is intended. All words used in the claims are intended to be used in the normal, customary usage of grammar and the English language.

BRIEF DESCRIPTION OF THE DRAWINGS

The stated and unstated objects, features and advantages of the present inventions (sometimes used in the singular, but not excluding the plural) will become apparent from the following descriptions and drawings, wherein like reference numerals represent like elements in the various views, and in which:

FIG. 4 is a side elevational view of a preferred clamp of the present invention shown installed on a representative grill and with a side table attached as the accessory, taken along line 4-4 of FIG. 1;

FIG. 5 is a top perspective view showing installation of a preferred clamp of the present invention on a representative grill supporting a representative side table.

DETAILED DESCRIPTION OF PREFERRED EMBODIMENTS

Set forth below is a description of what is currently believed to be the preferred embodiments or best representative examples of the inventions claimed. Future and present alternatives and modifications to the embodiments and preferred embodiments are contemplated. Any alternatives or modifications which make insubstantial changes in function, purpose, structure or result are intended to be covered by the claims of this patent.

Figure 1:
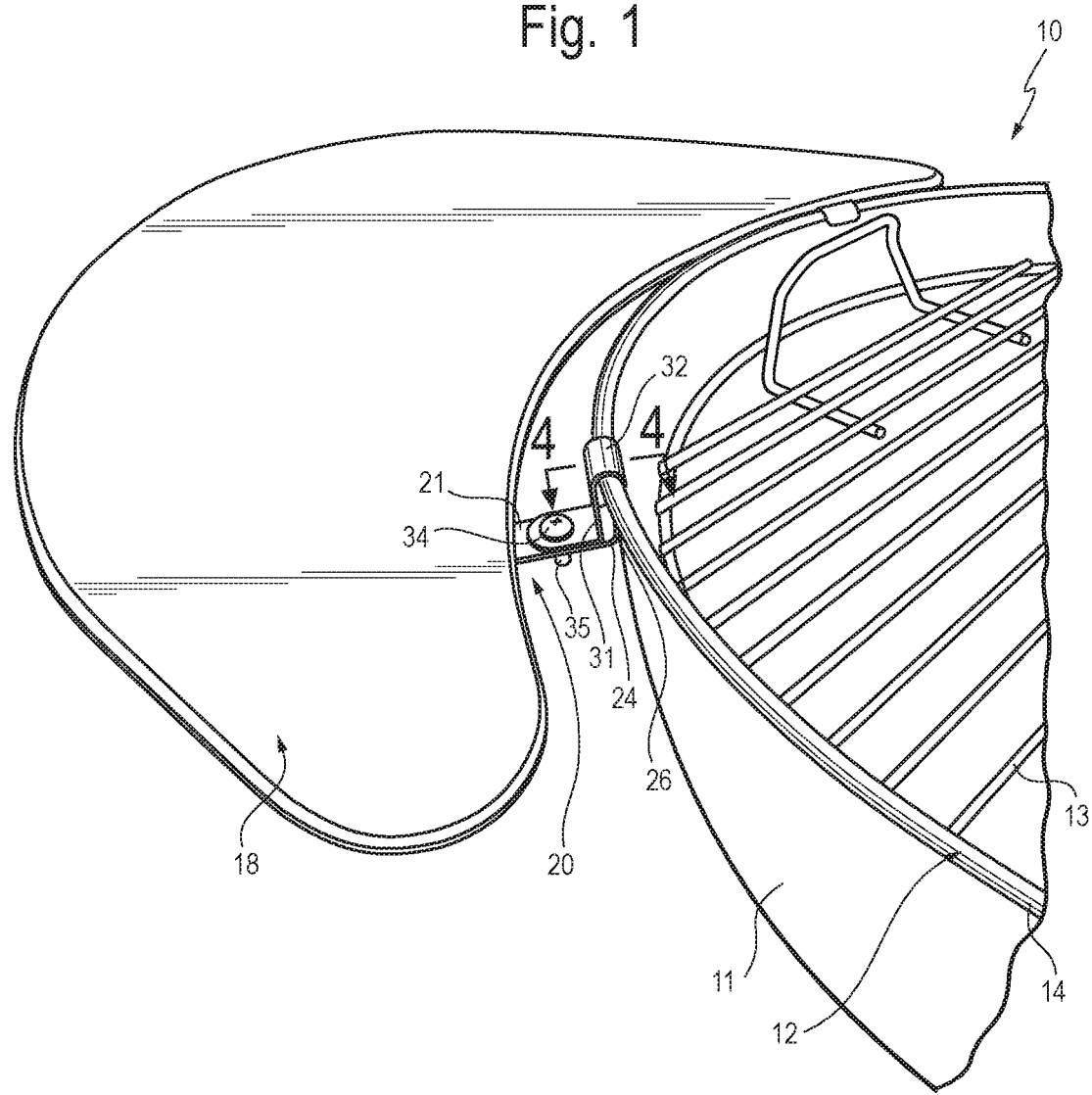
FIG. 1 is a perspective view of a preferred embodiment of the clamp of the present invention shown attached to a representative grill and supporting a representative accessory such as a side table.

A preferred clamp 20 of the present inventions is shown FIG. 1 installed on a representative grill 10. The grill 10 includes a generally bowl shaped grill body 11 terminating in an upper rim 12. The inside of the grill body supports a cooking grate 13. Upper rim 12 includes an exterior facing rolled lip 14 that creates an exterior recess 15 which faces downward (see FIG. 4). Clamp 20 is shown supporting a representative accessory 18, here a side table.

Clamp 20 is shown installed on a typical Weber kettle® grill manufactured and sold by Weber-Stephen Products LLC. It will be understood by those of skill in the art that clamp 20 of the present inventions may be used on a wide variety of charcoal, gas or electric grills, or even other appliances or articles. In addition, clamp 20 is shown supporting a side table as accessory 18. It will be understood by those of skill in the art that a wide variety of accessories, such as shelves, hooks and the like, may be attached to grill 10 with clamp 20.

Figure 2:
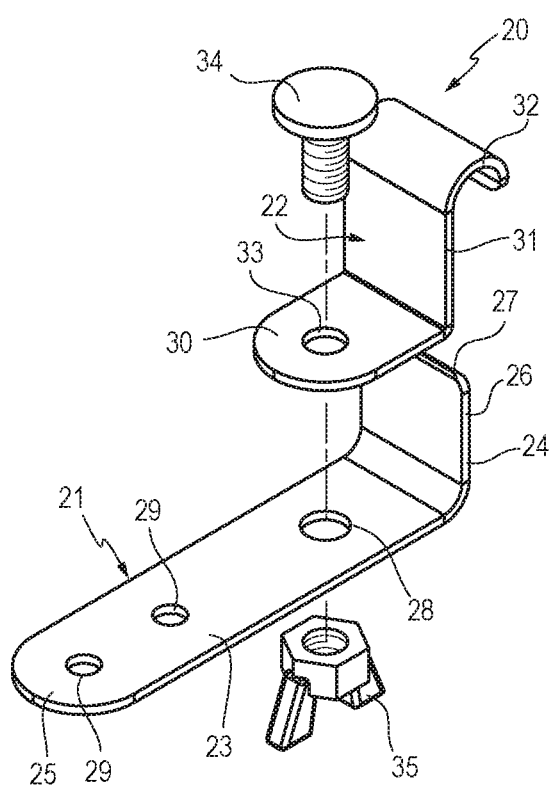
FIG. 2 is an exploded perspective view showing the components of a preferred embodiment of the clamp of the present invention.
Figure 3:
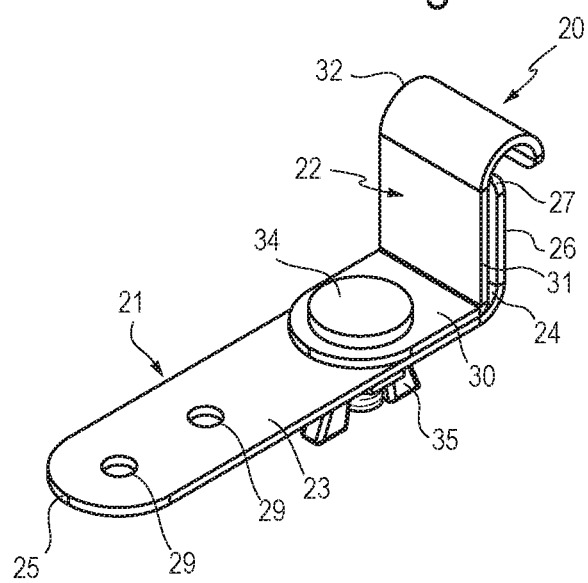
FIG. 3 is a perspective view of the clamp of FIG. 2 shown in an assembled condition.

A preferred embodiment of clamp 20 may be seen by reference to FIGS. 2, 3 and 4. Clamp 20 includes a base member 21 and a hanger member 22. Base member 21 includes a lateral portion 23. Lateral portion 23 further includes a grill attachment end 24 and an accessory support end 25. Grill attachment end 24 is proximal grill body 11 and accessory support end 25 extends distally from grill body 11. In a preferred embodiment, the lateral portion 23 extends outwardly from grill body 11 so that it is generally parallel to the ground or other support surface of the grill 10. It will be understood by those of skill in the art that a different orientation or angle of base member 21 may be used depending upon the desired orientation of the accessory 18 that is attached to grill 10.

Grill attachment end 24 of lateral portion 23 of base member 21 includes an upwardly extending flange 26 terminating in an upper edge 27. In a preferred embodiment, upwardly extending flange 26 is at a generally right angle to lateral portion 23. Upwardly extending flange 26 terminates in an upper edge 27. Lateral portion 23 of base member 21 also includes an attachment hole 28 near the proximal end and one or more bores 29 at its distal end so that it may be secured to hanger member 22 as hereinafter described.

Preferred hanger member 22 includes a base portion 30, a generally vertical portion 31 and a hook portion 32. Base portion 30 may include an attachment hole 33 that aligns with attachment hole 28 of lateral portion 23 of base member 21. An assembly bolt 34 and a wing nut 35 are also provided in the preferred embodiment.

To install clamp 20 to support accessory 18, the accessory or table 18 is attached to accessory support end 25 of base member 21 as shown in FIG. 4. A screw or bolt 19 may be used to secure accessory 18 to base member 21 through a hole or holes 29 on accessory attachment end 25. It will be understood by those of skill in the art that other methods of attaching accessory 18 to base member 21 may be used, including adhesives, nails or other forms of attachment.

The attachment of clamp 20 to grill body 11 is best seen by reference to FIGS. 1, 4 and 5. Specifically, the upper edge 27 of upwardly extending flange 26 of base member 21 is inserted into the exterior recess 15 created by rolled lip 14 of upper rim 12. This prevents the downward rotation of base member 21. The hook portion 32 of hanger member 22 is placed over rolled lip 14. Hanger member 22 is then secured to base member 21 using assembly bolt 34 and wing nut 35 which passes through connecting bore 28 of base member 21 and bore 33 of hanger member 22. In this manner, clamp 20 secures accessory 18 to grill 11 without the need for holes or other modifications to the grill.

In practice, the preferred installation of clamp 20 on grill 11 is best shown in FIG. 5. Hanger member 22 is loosely attached to base member 21 with bolt 34 and wing nut 35. The upper edge 27 of upwardly extending flange 26 is inserted into the exterior recess 15 of rolled lip 14. Hanger member 22 is then rotated over rolled lip 14 until hook portion 32 engages the rolled lip 14. The base member 21 and hanger member 22 are then firmly secured using bolt 34 and wing nut 35. In this manner, the accessory 18 is securely yet removably secured to grill 10 via clamp 20 without altering the grill body.

It will be understood by those of skill in the art that clamp 20 and its components may be made from a variety of materials, such as steel, stainless steel or plastic, as long as the material is capable of withstanding the heat generated by the grill. In addition, those portions of clamp 20 that come in contact with the grill may be covered in silicone or some other temperature resistant material to avoid scratching or otherwise damaging the finish of the grill.

The above description is not intended to limit the meaning of the words used in or the scope of the following claims that define the invention. Rather, it is contemplated that future modifications in structure, function or result will exist that are not substantial changes and that all such insubstantial changes in what is claimed are intended to be covered by the claims. Thus, while preferred embodiments of the present inventions have been illustrated and described, it will be understood that changes and modifications can be made without departing from the claimed invention. In addition, although the term "claimed invention" or "present invention" is sometimes used herein in the singular, it will be understood that there are a plurality of inventions as described and claimed.

Various features of the present inventions are set forth in the following claims.

What is claimed is:

1. An apparatus, comprising:
    a grill including a body terminating in an upper rim, the upper rim including a rolled lip having an exterior surface and an interior surface, the rolled lip forming a downwardly-facing recess;
    a side table including an upper surface, a lower surface located opposite the upper surface of the side table, and a side surface extending between the upper and lower surfaces of the side table, the side surface facing toward the body of the grill; and
    a clamp removably coupling the side table to the grill, the clamp including:
        a base member having a lateral portion and a flange portion, the lateral portion having a first end, a second end located opposite the first end of the lateral portion, a planar upper surface extending between the first and second ends of the lateral portion, a planar lower surface located opposite the planar upper surface of the lateral portion and extending between the first and second ends of the lateral portion, a first opening extending through the planar upper and planar lower surfaces of the lateral portion, and a second opening extending through the planar upper and planar lower surfaces of the lateral portion, the flange portion extending upwardly from the second end of the lateral portion, the flange portion terminating in an upper edge, the upper edge extending into the downwardly-facing recess;

a hanger member having a base portion, a vertical portion, and a hook portion, the base portion having a first end, a second end located opposite the first end of the base portion, a planar upper surface extending between the first and second ends of the base portion, a planar lower surface located opposite the planar upper surface of the base portion and extending from the first end of the base portion to the second end of the base portion, and a first opening extending through the planar upper and planar lower surfaces of the base portion, the first opening of the base portion being aligned with the first opening of the lateral portion, an entirety of the planar lower surface of the base portion contacting a portion of the planar upper surface of the lateral portion, the vertical portion extending upwardly from the second end of the base portion, the hook portion extending inwardly from the vertical portion toward the grill, the hook portion having an interior surface contacting the exterior surface of the rolled lip;

a first fastener extending through the first opening of the lateral portion and the first opening of the base portion, the first fastener coupling the base portion of the hanger member to the lateral portion of the base member; and a second fastener extending through the second opening, the second fastener coupling the side table to the lateral portion of the base member.

2. The apparatus of claim 1, wherein the first end of the base portion of the hanger member is located between the first and second openings of the lateral portion of the base member.

3. The apparatus of claim 1, wherein the first end of the base portion of the hanger member is located between the side surface of the side table and the rolled lip of the grill.

4. The apparatus of claim 1, wherein the first end of the base portion of the hanger member is located between the side surface of the side table and the upper rim of the grill.

5. The apparatus of claim 1, wherein the first end of the base portion of the hanger member is located between the side surface of the side table and the body of the grill.

6. The apparatus of claim 1, wherein the lower surface of the side table contacts the upper surface of the lateral portion of the base member.

7. The apparatus of claim 1, wherein a curvature of the interior surface of the hook portion complements a curvature of the exterior surface of the rolled lip.

8. The apparatus of claim 1, wherein the first fastener includes a bolt and a wing nut, and wherein the hanger member is rotatable about the bolt relative to the base member in response to the wing nut being loosened on the bolt while the side table is coupled to the lateral portion of the base member and while the upper edge of the flange portion of the base member extends into the downwardly-facing recess of the rolled lip of the grill.

9. The apparatus of claim 1, wherein the side table includes a bore located along and extending into the lower surface of the side table, and wherein the second fastener extends into the bore.

10. An apparatus configured to be coupled to a grill, the grill including a body terminating in an upper rim, the upper rim including a rolled lip having an exterior surface and an interior surface, the rolled lip forming a downwardly-facing recess, the apparatus comprising:

a side table including an upper surface, a lower surface located opposite the upper surface of the side table, and a side surface extending between the upper and lower surfaces of the side table, the side surface facing toward the body of the grill; and a clamp coupled to the side table and configured to removably couple the side table to the grill, the clamp including:

a base member having a lateral portion and a flange portion, the lateral portion having a first end, a second end located opposite the first end of the lateral portion, a planar upper surface extending between the first and second ends of the lateral portion, a planar lower surface located opposite the planar upper surface of the lateral portion and extending between the first and second ends of the lateral portion, a first opening extending through the planar upper and planar lower surfaces of the lateral portion, and a second opening extending through the planar upper and planar lower surfaces of the lateral portion, the flange portion extending upwardly from the second end of the lateral portion, the flange portion terminating in an upper edge, the upper edge configured to extend into the downwardly-facing recess;

a hanger member having a base portion, a vertical portion, and a hook portion, the base portion having a first end, a second end located opposite the first end of the base portion, a planar upper surface extending between the first and second ends of the base portion, a planar lower surface located opposite the planar upper surface of the base portion and extending from the first end of the base portion to the second end of the base portion, and a first opening extending through the planar upper and planar lower surfaces of the base portion, the first opening of the base portion being aligned with the first opening of the lateral portion, an entirety of the planar lower surface of the base portion contacting a portion of the planar upper surface of the lateral portion, the vertical portion extending upwardly from the second end of the base portion, the hook portion extending inwardly from the vertical portion toward the grill, the hook portion having an interior surface configured to contact the exterior surface of the rolled lip;

a first fastener extending through the first opening of the lateral portion and the first opening of the base portion, the first fastener coupling the base portion of the hanger member to the lateral portion of the base member; and a second fastener extending through the second opening, the second fastener coupling the side table to the lateral portion of the base member.

11. The apparatus of claim 10, wherein the first end of the base portion of the hanger member is located between the first and second openings of the lateral portion of the base member.

12. The apparatus of claim 10, wherein the first end of the base portion of the hanger member is configured to be located between the side surface of the side table and the rolled lip of the grill when the side table is coupled to the grill via the clamp.

13. The apparatus of claim 10, wherein the first fastener includes a bolt and a wing nut, and wherein the hanger member is rotatable about the bolt relative to the base member in response to the wing nut being loosened on the bolt while the side table is coupled to the lateral portion of the base member.

14. A clamp configured to removably couple a side table to a grill, the grill including a body terminating in an upper rim, the upper rim including a rolled lip having an exterior surface and an interior surface, the rolled lip forming a downwardly-facing recess, the side table including an upper surface, a lower surface located opposite the upper surface of the side table, and a side surface extending between the upper and lower surfaces of the side table, the side surface configured to face toward the body of the grill, the clamp comprising:

a base member having a lateral portion and a flange portion, the lateral portion having a first end, a second end located opposite the first end of the lateral portion, a planar upper surface extending between the first and second ends of the lateral portion, a planar lower surface located opposite the planar upper surface of the lateral portion and extending between the first and second ends of the lateral portion, a first opening extending through the planar upper and planar lower surfaces of the lateral portion, and a second opening extending through the planar upper and planar lower surfaces of the lateral portion, the flange portion extending upwardly from the second end of the lateral portion, the flange portion terminating in an upper edge, the upper edge configured to extend into the downwardly-facing recess;

a hanger member having a base portion, a vertical portion, and a hook portion, the base portion having a first end, a second end located opposite the first end of the base portion, a planar upper surface extending between the first and second ends of the base portion, a planar lower surface located opposite the planar upper surface of the base portion and extending from the first end of the base portion to the second end of the base portion, and a first opening extending through the planar upper and planar lower surfaces of the base portion, the first opening of the base portion being aligned with the first opening of the lateral portion, an entirety of the planar lower surface of the base portion contacting a portion of the planar upper surface of the lateral portion, the vertical portion extending upwardly from the second end of the base portion, the hook portion configured to extend inwardly from the vertical portion toward the grill, the hook portion having an interior surface configured to contact the exterior surface of the rolled lip;

a first fastener extending through the first opening of the lateral portion and the first opening of the base portion, the first fastener coupling the base portion of the hanger member to the lateral portion of the base member; and a second fastener extending through the second opening, the second fastener configured to couple the side table to the lateral portion of the base member.

15. The clamp of claim 14, wherein the first end of the base portion of the hanger member is located between the first and second openings of the lateral portion of the base member.

16. The clamp of claim 14, wherein the first end of the base portion of the hanger member is configured to be located between the side surface of the side table and the rolled lip of the grill when the side table is coupled to the grill via the clamp.

17. The clamp of claim 14, wherein the first fastener includes a bolt and a wing nut, and wherein the hanger member is rotatable about the bolt relative to the base member in response to the wing nut being loosened on the bolt while the side table is coupled to the lateral portion of the base member.

18. The apparatus of claim 8, wherein the wing nut is located below the planar lower surface of the lateral portion.

\* \* \* \* \*